United States Patent
Mori et al.

(10) Patent No.: US 7,529,043 B2
(45) Date of Patent: May 5, 2009

(54) BEAM SHAPING OPTICAL DEVICE, OPTICAL HEAD, AND OPTICAL INFORMATION MEDIUM DRIVE UNIT

(75) Inventors: Eishin Mori, Kyoto (JP); Keiichi Matsuzaki, Ikeda (JP); Hidenori Wada, Uji (JP); Hideki Hayashi, Nara (JP)

(73) Assignee: Panasonic Corporation, Osaka (JP)

( * ) Notice: Subject to any disclaimer, the term of this patent is extended or adjusted under 35 U.S.C. 154(b) by 295 days.

(21) Appl. No.: 10/542,361

(22) PCT Filed: Jul. 6, 2004

(86) PCT No.: PCT/JP2004/009896

§ 371 (c)(1),
(2), (4) Date: Jul. 14, 2005

(87) PCT Pub. No.: WO2005/003820

PCT Pub. Date: Jan. 13, 2005

(65) Prior Publication Data

US 2006/0114580 A1 Jun. 1, 2006

(30) Foreign Application Priority Data

Jul. 8, 2003 (JP) ............................. 2003-271801
Sep. 4, 2003 (JP) ............................. 2003-312894

(51) Int. Cl.
*G02B 7/02* (2006.01)
(52) U.S. Cl. ........................ 359/811; 359/813; 359/819
(58) Field of Classification Search ................ 359/811, 359/813, 819, 821, 822, 823
See application file for complete search history.

(56) References Cited

U.S. PATENT DOCUMENTS 4,918,702 A * 4/1990 Kimura ........................ 372/34
5,701,191 A * 12/1997 Iwasaki ........................ 359/205

FOREIGN PATENT DOCUMENTS

| JP | 61-153123 | 9/1986 |
| JP | 5-93881 | 4/1993 |
| JP | 10-334472 | 12/1998 |
| JP | 2001-243650 | 9/2001 |
| JP | 2002-287018 | 10/2002 |

* cited by examiner

*Primary Examiner*—Ricky L Mack
*Assistant Examiner*—Brandi N Thomas
(74) *Attorney, Agent, or Firm*—Wenderoth, Lind & Ponack L.L.P.

(57) ABSTRACT

A lens surface of a collimating lens closer to a light source is in contact with a retracted surface at one end surface of a barrel. On a projecting surface at an outer side of the one end surface of the barrel, grooves are formed at a plurality of positions symmetric with respect to an optical axis. An adhesive deposited in the grooves is applied to an outer circumferential surface of the collimating lens to fix the collimating lens in the barrel. Since the grooves are formed to be shallower than the retracted surface, the adhesive does not intrude onto the retracted surface. The barrel is pressed against a wall surface formed in an inner circumferential surface of a barrel holder main portion and having a V-shaped cross section by a leaf spring, thereby being held at a specified position in the barrel holder main portion. An amount of change in distance from a reference surface to a held position of the collimating lens per unit temperature is set to conform to a sum of an amount of change in movement of the light source from the reference position per unit temperature and an amount of change of back focus of the collimating lens per unit temperature.

17 Claims, 11 Drawing Sheets $\Delta L \approx \Delta f + \Delta t$ $\Delta L \approx \Delta f + \Delta t$

BEAM SHAPING OPTICAL DEVICE, OPTICAL HEAD, AND OPTICAL INFORMATION MEDIUM DRIVE UNIT

BACKGROUND OF THE INVENTION

1. Field of the Invention

The present invention relates to a beam shaping optical device, an optical head using such a device, and an optical information medium driving unit.

2. Description of the Related Art

A semiconductor laser is normally used as a light source in an optical system of an optical head for recording and regeneration of information in and from an optical disc medium such as a CD, a DVD, or a Blu-ray disc. Intensity of a light emitted from this semiconductor laser generally has an elliptical distribution. In a case of concentrating this light having the elliptical intensity distribution by use of an objective lens in the optical head, it is generally known that a spot diameter of gathered light is inversely proportional to an incident beam diameter on the objective lens, whereby the spot diameter of the gathered light becomes larger along a direction of a minor axis of the elliptical intensity distribution, than along a direction of a major axis, to reduce a resolving power of signal recording and regeneration.

In order to correct differences in the intensity distribution, a circular opening can be provided in a light path of the optical head to correct light incident on the objective lens into a circular beam. However, since part of the beam is shaded in this case, there is a disadvantage of reducing utilization efficiency of a laser beam.

Accordingly, in order to improve a light concentrating property without impairing utilization efficiency of emitted light, a beam shaping optical device for converting a flux of light having an elliptical intensity distribution, and emitted from a semiconductor laser, into a beam having an approximately circular intensity distribution has been used.

The beam shaping optical device is, for example, comprised of a collimating lens for converting a laser beam into a parallel beam, and a beam shaping prism for converting an elliptical parallel beam into a circular beam by refraction.

However, in a conventional beam shaping optical device, a member holding a lens, and an optical base on which an optical element is arranged, may undergo thermal expansion as a temperature of the beam shaping optical device changes. In such a case, parallelism of a collimated beam decreases due to displacements of a focus position of the collimating lens and a position of a light source, resulting in a problem of producing astigmatism in the collimated beam having passed the beam shaping prism. Further, a change in a refractive index of material of the collimating lens in relation to temperature, a change in a wavelength of the light source and the like may occur to cause displacements of the focus position of the collimating lens and the position of the light source. This reduces parallelism of the collimated beam, resulting in a problem of producing astigmatism in the collimated beam having passed the beam shaping prism.

A known conventional optical head includes a lens holding construction disclosed, for example, in Japanese Unexamined Patent Publication No. H10-334472. As shown in FIGS. 13A-13C, in the lens holding construction disclosed in this publication, a lens frame 124 holding a collimating lens 113 is substantially in the form of a round column and has a hollow portion having a central axis aligned with an optical axis O in order to form a light path.

One opening end of the hollow portion of the lens frame 124 is widened toward an end in order to mount a semiconductor laser. Another opening end is also widened to form an inner circumferential surface 124a in the form of a short tube. The collimating lens 113 is accommodated and held inside this inner circumferential surface 124a. A radius of the inner circumferential surface 124a is set to be slightly larger than that of an outer circumferential surface 113a of the collimating lens so that a clearance 125 is defined over an entire circumference between the inner circumferential surface 124a and the outer circumferential surface 113a in the form of a short tube.

In this holding construction, in order to position the collimating lens 113 along a direction of the optical axis, an adhesive 116 is applied to a contact surface 124b that is ring-shaped so as to be rotationally symmetric with respect to the optical axis O, and one lens surface 113b of the collimating lens 113 is brought into contact with this contact surface 124b to adhere and fix the collimating lens 113 by the adhesive 116. In this way, the collimating lens 113 is held in the lens frame 124. A radius of an outer side of the ring-shaped contact surface 124b may be extended up to the inner circumferential surface 124a of the lens frame 124. However, by making this radius smaller than a radius of the collimating lens 113 up to the outer circumferential surface 113a as shown in FIG. 13, the adhesive 116 can be prevented from coming out from between the inner circumferential surface 124a of the lens frame 124 and the outer circumferential surface 113a of the collimating lens 113. Even if the collimating lens 113 should be fixed in an eccentric manner, influence on a held state by the adhesive 116 between the lens surface 113b and the contact surface 124b can be advantageously reduced.

Further, the clearance 125 defined over the entire circumference between the inner circumferential surface 124a of the lens frame 124 and the outer circumferential surface 113a of the collimating lens 113 can provide an effect of preventing thermal deformation of the lens frame 124, due to an ambient temperature change, from directly acting on the outer circumferential surface 113a of the collimating lens 113. If the clearance 125 is provided, an effect of suppressing eccentricity of the collimating lens 113 and the lens frame 124 is weakened, but such a weakened effect is dealt with by changing an adhering method.

Furthermore, since the adhesive 116 is applied to the ring-shaped contact surface 124b provided in the lens frame 124 for positioning the collimating lens 113 with respect to a direction of the optical axis to adhere the collimating lens 113, a force trying to move the collimating lens 113 in a radial direction resulting from thermal deformation of the lens frame 124 caused by an ambient temperature change is canceled by being radially distributed. Specifically, even if the lens frame 124 thermally expands due to the ambient temperature change, radially outward forces acting on the collimating lens 113 by the thermal expansion of the lens frame 124 are canceled out by substantially equal forces acting in opposite directions on adhered portions symmetric with respect to the optical axis O since the collimating lens 113 fixed in this lens frame 124 is fixed via the adhesive 116 at a ring-shaped portion equidistant from a center of the lens frame.

A construction in which parallelism of a collimated beam does not decrease due to a change in the refractive index of the material of the collimating lens in relation to temperature and a change in the wavelength of the light source is proposed in Japanese Unexamined Patent Publication No. 2002-287018. FIG. 14 shows one exemplary construction of an optical head including a conventional beam shaping optical device disclosed in this publication. The conventional beam shaping optical device in FIG. 14 includes a light source 201, a collimating lens 202 fixed to a barrel 210, and a beam shaping optical element 203, wherein a beam having an elliptical intensity distribution and emitted from the light source 201 is converted into a parallel beam by the collimating lens 202 and further converted into a flux of light having a circular intensity distribution by the beam shaping optical element 203. The flux of light emerged from the beam shaping optical element 203 is reflected by a rising mirror 204 and focused on a recording surface of a disc 206 by an objective lens 205. This beam modulated and reflected by pit rows on the disc recording surface passes through the objective lens 205 again, is reflected by the rising mirror 204 and split by a splitting surface 203a of the beam shaping optical element 203. Thereafter, this beam is gathered by a detection lens 207 and, consequently, a modulated signal light is received by a light receiving element 208.

As disclosed in this publication, in the beam shaping optical device, a change in focal length of the collimating lens 202 is compensated by a change in a refractive index of material of the collimating lens 202 resulting from a temperature change, and a change in the refractive index of the collimating lens 202 resulting from a wavelength change caused by a temperature change of the light source, whereby a reduction in quality of a collimated beam caused by a temperature change is suppressed.

An operation in a wide temperature environment from low temperature to high temperature must be guaranteed for an optical head device. However, in the optical head shown in FIG. 13, the collimating lens 113, the lens frame 124 holding the collimating lens 113 and the lens holding construction holding the lens frame 124 undergo thermal expansion, thereby causing a relative displacement between a laser emission point and the collimating lens 113. In addition, as ambient temperature changes, a wavelength of the laser light source changes and a curvature and refractive index of the collimating lens 113 change, whereby a focal length of the collimating lens 113 deviates. As a result, there has been a problem of deteriorating collimation quality of incident light on the beam shaping optical element, i.e. parallelism of the incident light. This deterioration of the collimation quality of the incident light produces astigmatism in a flux of light after beam shaping, thereby deteriorating spot quality on the disc surface when the light is concentrated by the objective lens. As a result, there has been a problem of deteriorating recording and regeneration properties.

Further, since the collimating lens 113 has its lens surface fixed by the adhesive 116 in the conventional optical head device shown in FIG. 13, there has been a problem of varying displacements of the collimating lens 113 along the direction of the optical axis and a direction normal thereto resulting from thermal expansion and contraction of the adhesive 116 because an applied amount of the adhesive 116 differs depending on a device and depending on an adhered position. Since a resin having a high thermal expansion rate is used for the adhesive 116, an extent of expansion and contraction of the adhesive 116 resulting from a temperature change is not negligible. For example, a variation in thickness of the adhesive 116 causes a variation of an amount of change in a distance of the collimating lens 113 from the light source resulting from the temperature change. Since a width of the adhesive 116 is uneven along a circumference of the contact surface 124b, radial forces asymmetrically act on the collimating lens 113 as the temperature changes, whereby the collimating lens 113 is displaced in a direction normal to the optical axis. This displacement of the collimating lens 113 along the direction normal to the optical axis displaces the optical axis O, thereby becoming a main factor for displacing the spot of the detection light. Variation in the displacement of the collimating lens 113 resulting from variations upon applying the adhesive 116 could not be evened out.

Further, since a lens surface is adhered, there have been a problem of staining the collimating lens 113 by the adhesive 116, a problem of enlargement by providing a clearance between the lens frame 124 and the collimating lens 113, and a problem of increased costs due to a complicated shape of the lens frame 124. In addition, there has been a problem of necessitating a high adjustment precision. These problems have led to problems of deteriorated temperature characteristics and increased costs in an optical head device having the lens supporting construction integral to the barrel shown in FIG. 13, and also in an optical information device having such an optical head device.

There is also a problem that a focal length of the collimating lens changes due to the change in the wavelength of the light source caused by factors other than temperature, such as a wavelength change resulting from a change in output of the light source at a time of recording and regeneration, thereby deteriorating collimation quality of light emitted from the beam shaping optical device.

Since refractive indices of general optical materials largely change at wavelengths in a short wavelength region, deterioration of the collimation quality of light emitted from the beam shaping optical device is conspicuously seen if a light source having a short wavelength is used such as in the case of a Blu-ray disc.

BRIEF SUMMARY OF THE INVENTION

In view of the above problems, an object of the present invention is to provide a beam shaping optical device capable of suppressing deterioration of a collimation quality resulting from a temperature change, and an optical head and an optical information medium driving unit using such a device.

In order to accomplish the above object, a first aspect of the present invention is directed to a beam shaping optical device, comprising: a base; a barrel holder held on the base; a light source held in the barrel holder; a barrel held in the barrel holder; and a collimating lens held in the barrel for converting a beam emitted from the light source into a parallel beam, wherein a difference between an amount of change in a distance from a specified reference position in the barrel holder to a collimating lens holding position per unit temperature, and a sum of an amount of change in movement of the light source from the reference position per unit temperature and an amount of change in back focus of the collimating lens per unit temperature is set to be equal to or below a specified value.

A second aspect of the present invention is directed to a beam shaping optical device, comprising: a base; a barrel holder held on the base; a light source held in the barrel holder; a barrel held in the barrel holder; and a collimating lens held in the barrel for converting a beam emerged from the light source into a parallel beam, wherein the barrel includes a contact portion held in contact with a front surface of the collimating lens closer to the light source.

In this beam shaping optical device, a difference between an amount of change in a distance from a specified reference position in the barrel holder to the front surface per unit temperature, and a sum of an amount of change in movement of the light source from the reference position per unit temperature and an amount of change in back focus of the collimating lens per unit temperature may be set to be equal to or below a specified value.

The contact portion may be directly held in contact with the front surface of the collimating lens without using an adhesive.

The contact portion may be a flat surface and held in surface contact with a flat surface portion provided on the front surface of the collimating lens.

The contact portion may be an oblique surface that is closer to the light source as being closer to an optical axis, and held in surface contact with an oblique surface portion provided on the front surface of the collimating lens.

An adhesive may be applied at positions of an outer circumferential surface of the collimating lens, which positions are symmetrical with respect to an optical axis; and the collimating lens may be adhered to the barrel by an adhesive.

One end of the barrel may be stepped such that an outer circumferential portion projects more along an axial direction than an inner circumferential portion; the inner circumferential portion may form the contact portion held in contact with the front surface of the collimating lens; the outer circumferential portion may be formed with grooves at a plurality of positions symmetric with respect to the optical axis, with the grooves having the same width along a circumferential direction and crossing from an inner circumferential side toward an outer circumferential side; and the adhesive may be applied in the grooves.

The grooves may be so formed as not to reach the inner circumferential portion.

The collimating lens may include at least two lenses comprised of convex and concave lenses, and a change in a refractive index of a material of the convex lens in relation to temperature may be substantially zero or negative.

The collimating lens may include at least two lenses comprised of convex and concave lenses, and a change in a refractive index of a material for the concave lens in relation to temperature may be positive.

The collimating lens may include at least two lenses comprised of convex and concave lenses and, when $dn_1/dT$ and $dn_2/dT$ denote a change in a refractive index of a material of the convex lens in relation to temperature and a change in a refractive index of a material of the concave lens in relation to temperature, respectively, $dn_1/dT$ and $dn_2/dT$ may satisfy the following relational expression:

$$dn_2/dT > 4.9 \times dn_1/dT - 5.0.$$

In this case, an Abbe number of the material of the convex lens at a wavelength of the light source may be larger than that of the material of the concave lens at the same wavelength, and when $\lambda[nm]$, $W[\lambda]$ and $\Delta W/\Delta\lambda$ denote the wavelength of the light source, a wavefront aberration of the collimating lens, and a change in the wavefront aberration caused by a wavelength change, respectively, $\Delta W/\Delta\lambda$ preferably satisfies the following relational expression at an effective aperture of the collimating lens:

$$|\Delta W/\Delta\lambda| < 0.03 \ [\lambda/nm].$$

The collimating lens may include a single lens, a change in a refractive index of a material of the collimating lens in relation to temperature may be negative, and an Abbe number of the material of the collimating lens may be at least 55.

The following relational expression:

$$W(|(\Delta fb/\Delta T - \Delta L/\Delta T) \cdot (T - T_0)|) < 0.03 \ [\lambda]$$

may be satisfied when $\Delta L[mm]$ denotes an amount of change in a distance from the light source to the front surface of the collimating lens; $W(\Delta L)$ [$\lambda$] an amount of wavefront aberration in relation to the amount of change $\Delta L$; $\Delta fb/\Delta T$ an amount of change in the back focus of the collimating lens per unit temperature; $\Delta L/\Delta T[mm/°C.]$ an amount of change in spacing between the light source and the collimating lens per unit temperature due to thermal expansion of the barrel, the barrel holder and the base; $T_0$ normal temperature; and T temperature at which the beam shaping optical device is used, respectively.

The collimating lens may be formed to have a thickness that is 0.5 to 1 times a focal length of the collimating lens.

The collimating lens may include a single lens, may be formed to have a thickness in the range of 0.5 to 1 times the focal length of the collimating lens, and may be made of a material having a negative change in the refractive index in relation to temperature and having an Abbe number of at least 55.

The barrel and the barrel holder may be made of the same material.

The barrel and the barrel holder may be made of different materials, and a difference between linear expansion coefficients thereof may be at most $10^6 [/°C.]$.

In a case of providing a beam shaping optical element held onto the base for converting an intensity distribution of the parallel beam into a circular distribution, a focal position of the collimating lens may be displaced from the position of the light source in such a direction as to alleviate an aberration of the light emitted from the beam shaping optical element.

The wavelength of the light source may be at least 300 nm and at most 500 nm.

The present invention is also directed to an optical head, comprising the above beam shaping optical device and an objective lens for convergence of a beam having passed the beam shaping optical element.

The present invention is further directed to an optical information medium driving unit, comprising the above optical head; a driving mechanism for driving an optical information medium, a focus servo mechanism and a tracking servo mechanism for controlling the optical head in accordance with a focusing error signal and a tracking error signal obtained from the optical head.

According to the beam shaping optical device according to the first aspect of the present invention, the collimating lens is arranged such that a difference between an amount of change of the collimating lens per unit temperature resulting from expansion or contraction of the barrel holder and a sum of an amount of change in movement of a light emitting point of the light source and an amount of change in back focus of the collimating lens per unit temperature is equal to or below the specified value. Thus, deterioration of parallelism of an incident beam on a beam shaping optical element resulting from a temperature change, i.e. deterioration of a collimation quality resulting from a temperature change can be suppressed. Further, since the collimating lens is held in the barrel holder via the barrel, dimensional production errors can be taken up to easily position the collimating lens at a specified position. Therefore, the above amounts of change can be precisely adjusted while making most of an advantage of being able to facilitate positioning of the collimating lens.

According to the beam shaping optical device according to the second aspect of the present invention, since the barrel includes the contact portion held in contact with the front surface of the collimating lens, influence of thermal expansion of the collimating lens, which is normally not made of the same material as the barrel and barrel holder, on a change in distance from the light emitting point of the light source to the collimating lens in relation to temperature can be suppressed. Thus, optimal designing for suppressing deterioration of collimation quality caused by a temperature change can be easily made.

Further, in a case that the contact portion is directly held in contact with the front surface of the collimating lens without using an adhesive, influence of the adhesive, which is not made of the same material as the barrel and the barrel holder and has a high thermal expansion coefficient, on a change in distance from the light emitting point of the light source to the collimating lens in relation to temperature can be suppressed. This also solves a problem of variation in displacement of the collimating lens in a direction of an optical axis and a direction normal to the optical axis due to uneven application of the adhesive. Thus, optimal designing for suppressing deterioration of collimation quality caused by a temperature change can be easily made.

Further, in a case that the contact portion of the barrel is a flat surface and held in surface contact with a flat surface provided on the front surface of the collimating lens, the collimating lens can be easily molded since the contact surface of the collimating lens with the barrel can be formed as a flat surface.

Furthermore, in a case that the contact portion of the barrel is an oblique surface that is closer to the light source as being closer to an optical axis, and held in surface contact with an oblique surface portion provided on the front surface of the collimating lens, a position of the collimating lens along a direction normal to the optical axis is fixed at one point. This suppresses displacement of the collimating lens along the direction normal to the optical axis.

Further, in a case that the barrel holds the collimating lens via adhesive applied at optical-axis symmetrical positions on an outer circumferential surface of the collimating lens, forces acting on the collimating lens in radial directions resulting from a temperature change cancel out each other. As a result, displacement of the collimating lens in radial directions, i.e. displacement thereof in directions normal to the optical axis resulting from a temperature change can be suppressed.

Furthermore, in a case that the one end surface of the barrel is stepped, an end surface of an inner circumferential portion located at an inner side of this step is held in contact with the front surface of the collimating lens, an end surface of an outer circumferential portion located at an outer side of this step is formed at optical-axis symmetrical positions with the grooves having the same width and crossing from an inner circumferential side toward an outer circumferential side, and adhesive is applied to these grooves, with a width of this applied adhesive along a circumferential direction being uniformly defined by the groove. Thus, forces acting on the collimating lens in radial directions resulting from a temperature change can cancel out each other with satisfactory precision.

In a case that the grooves are so formed as not to reach the inner circumferential portion, adhesive applied to the grooves can be prevented from entering between the front surface of the collimating lens and a retracted surface.

Further, in a case that the collimating lens includes at least two lenses comprised of convex and concave lenses and a change in a refractive index of material of the convex lens in relation to temperature is substantially zero or negative, there can be constructed a beam shaping optical device having a high collimation quality by being less influenced by a temperature change.

Further, in a case that the collimating lens includes at least two lenses comprised of convex and concave lenses and a change in a refractive index of material of the concave lens in relation to temperature is positive, there can be constructed a beam shaping optical device having a high collimation quality by being less influenced by a temperature change.

Furthermore, in a case that the collimating lens includes at least two lenses comprised of convex and concave lenses and, when the change $dn_1/dT$ in the refractive index of the material of the convex lens in relation to temperature and the change $dn_2/dT$ in the refractive index of the material of the concave lens in relation to temperature satisfy:

$$dn_2/dT > 4.9 \times dn_1/dT - 5.0,$$

there can be constructed a beam shaping optical device having high collimation quality by being less influenced by a temperature change.

In this case, if an Abbe number of the material of the convex lens at the wavelength of the light source is larger than that of the material of the concave lens at the same wavelength, and the change $\Delta W/\Delta \lambda$ of the wavefront aberration $W[\lambda]$ of the collimating lens resulting from a change in the wavelength $\lambda$ of the light satisfies a relationship of $|\Delta W/\Delta \lambda| < 0.03\ [\lambda/nm]$ at an effective aperture of the collimating lens, there can be constructed a beam shaping optical device having a high collimation quality by not being influenced by the wavelength of the light source as a component of the beam shaping optical device.

Further, in a case that the collimating lens includes a single lens, a change in a refractive index of material of the collimating lens in relation to temperature is negative, and an Abbe number of material of the collimating lens is at least 55, there can be constructed a beam shaping optical device having high collimation quality by being less influenced by a temperature change.

Furthermore, in a case that an amount of wavefront aberration W at operating temperature T of the beam shaping optical device in relation to normal temperature $T_0$ satisfies the following relational expression:

$$W(|(\Delta fb/\Delta T - \Delta L/\Delta T)\cdot(T-T_0)|) < 0.03[\lambda]$$

when $W(\Delta L)[\lambda]$, $\Delta fb/\Delta T$ and $\Delta L/\Delta T[mm/^\circ C.]$ denote the amount of wavefront aberration in relation to change $\Delta L$ in spacing between the light source and the collimating lens in the beam shaping optical device, an amount of change in back focus of the collimating lens per unit temperature, and an amount of change in spacing between the light source and the collimating lens due to thermal expansion of the barrel, the barrel holder and the base, respectively, there can be constructed a beam shaping optical device having high collimation quality by being less influenced by a temperature change.

If a thickness of the collimating lens is 0.5 to 1 times a focal length of the collimating lens, the collimating lens can be directly held onto the base without via the barrel. Thus, there can be constructed a beam shaping optical device having high collimation quality without being influenced by thermal deformation of the barrel.

Further, in a case that the collimating lens includes the single lens, the thickness of the collimating lens is 0.5 to 1 times the focal length of the collimating lens, and material of the collimating lens has a refractive index, whose change in relation to temperature is negative, and an Abbe number of at least 55, there can be constructed a beam shaping optical device having a high collimation quality by being less influenced by a wavelength variation of the light source and thermal expansion and the like of the base and the barrel on and in which these optical systems are arranged.

In a case that the barrel and barrel holder are made of the same material, deformation and distortion resulting from a difference between linear expansion coefficients of the barrel and barrel holder can be suppressed.

Further, in a case that the barrel and barrel holder are made of different materials and a difference between linear expansion coefficients thereof is at most $10^{-6}[/° C.]$, deformation and distortion resulting from a difference between the linear expansion coefficients of the barrel and barrel holder can be suppressed.

Further, in a case that the collimating lens, the barrel and barrel holder are made of different materials and a difference between the linear expansion coefficients thereof is at most $10^{-6}[/° C.]$, deformation and distortion resulting from a difference between the linear expansion coefficients of the collimating lens, the barrel and barrel holder can be suppressed.

In a case of being displaced from a position of the light source in such a direction as to alleviate aberration of a beam emitted from the beam shaping optical element in the beam shaping optical device, a wavefront aberration of the beam emitted from the beam shaping optical device can be improved by displacing the position of the light source in such a manner as to cancel out the aberration of the constructing element of the beam shaping optical device.

If the wavelength of the light source lies within the range of from 300 nm to 500 nm, there can be constructed a beam shaping optical device having a good temperature characteristic despite use of a short-wavelength light source.

According to the optical head comprising the beam shaping optical device and the objective lens for convergence of a beam having passed the beam shaping optical element, deterioration of quality of a spot formed on a disc surface by the beam concentrated by an objective lens can be suppressed.

If the optical information medium driving unit comprises the optical head, the driving mechanism for driving the optical information medium and the focus servo mechanism and the tracking servo mechanism for controlling the optical head using the focusing error signal and the tracking error signal obtained from the optical head, deterioration of quality of a spot formed on a disc surface by the beam concentrated by the objective lens can be suppressed, whereby deterioration of recording and regeneration characteristics resulting from a temperature change can be suppressed.

DETAILED DESCRIPTION OF THE PREFERRED EMBODIMENTS

Best modes for embodying the present invention are described in detail with reference to the accompanying drawings.

First Embodiment

Figure 1A:
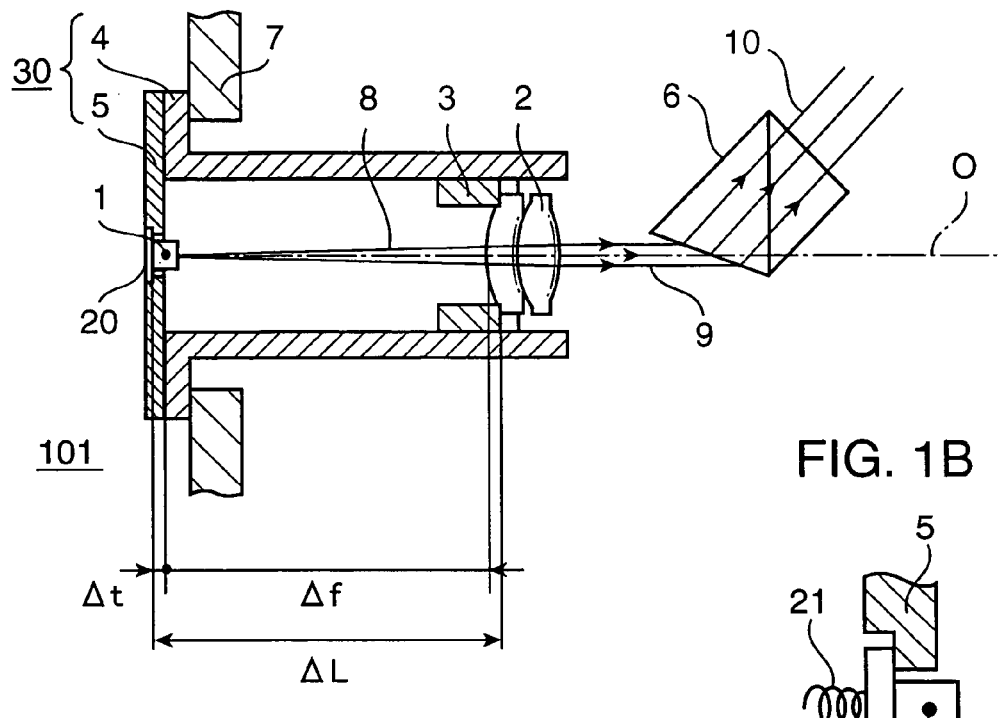
FIG. 1A is a sectional view schematically showing an entire construction of a beam shaping optical device according to a first embodiment of the present invention.
Figure 1B:
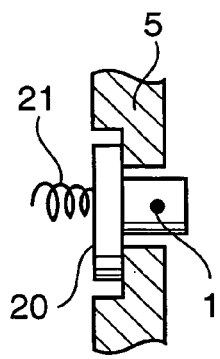
FIG. 1B is a sectional view showing a portion near a light source.
Figure 1C:
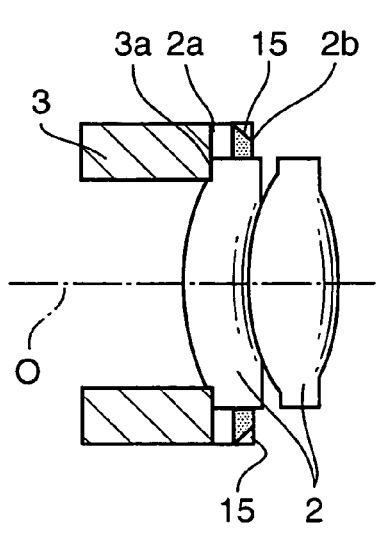
FIG. 1C is a sectional view showing a portion near a collimating lens.
Figure 1D:
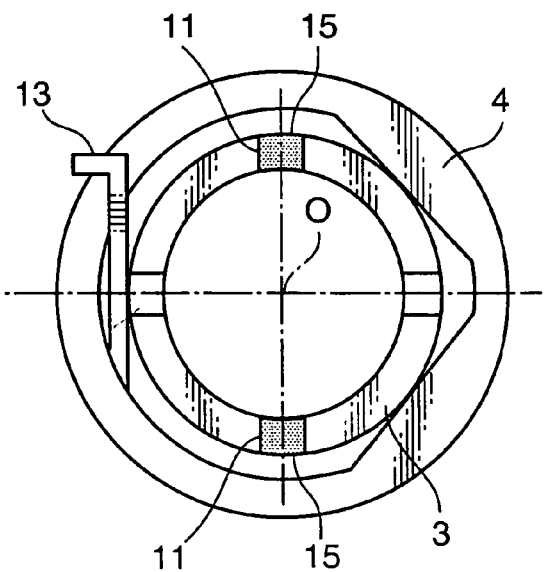
FIG. 1D is a side view of a barrel when viewed in a direction of an optical axis.

FIGS. 1A-1D are sections showing an exemplary construction of a beam shaping optical device according to a first embodiment of the present invention. Particularly, FIG. 1A is a side view in section schematically showing an entire construction of beam shaping optical device 101 according to this embodiment, FIG. 1B is a side view in section showing a portion near a light source in detail, FIG. 1C is a side view in section showing a portion near a collimating lens in detail, and FIG. 1D is a front view in section showing a portion including a barrel in detail. In FIGS. 1A-1D, identified by 20, 2 and 6 are a light source, a collimating lens and a beam shaping optical element, wherein the light source 20 is fixed to a plate 5 as a bottom of a barrel holder, and the collimating lens 2 is held in a barrel 3. The barrel 3 is fixedly held in a barrel holding main body 4 such that an optical axis O coincides between the collimating lens 2 and the light source 20. The barrel holder main body 4 is fixed at a specified position of a base 7. Although not shown, the base 7 also holds the beam shaping optical element 6, thereby maintaining a positional relationship between a barrel holder 30 (barrel holder main body 4 and barrel holder bottom portion 5) and the beam shaping optical element 6.

A semiconductor laser is used as the light source 20, a dispersed beam 8 emitted from an emission point 1 of the light source 20 and having an elliptical intensity distribution is converted into a parallel beam 9 by the collimating lens 2 and has a beam diameter converted by the beam shaping optical element 6 to become a luminous flux 10 having a circular intensity distribution. The semiconductor laser used as the light source 20 is, for example, of a can type, and a front surface of a flange of the light source 20 closer to the collimating lens 2 is in contact with the barrel holder bottom portion 5 while a rear surface thereof is held in the barrel holder bottom portion 5 by being pressed by a spring 21. The light source 20 and the barrel holder bottom portion 5 are directly in contact with each other without using an adhesive. The spring 21 is biased by a member (not shown), for example, coupled to the barrel holder bottom portion 5. Instead of this spring 21, a leaf spring formed with a projection may be mounted in the barrel holder bottom portion 5 below the light source 20, and the leaf spring and a lower part of the light source 20 may be supported in contact by this projection.

The barrel holder 30 and the barrel 3 are made of the same material in order to let their thermal expansion coefficients agree with each other. Preferably, aluminum, zinc, magnesium or a like metallic material that has a low thermal expansion coefficient (about $2.4 \times 10^{-6}$) and a certain strength and is difficult to thermally deform and easily workable is used as such a material. A ceramic can be used as material for the barrel holder 30 and the barrel 3 although it has inferior workability. The collimating lens 2 is preferably made of a glass.

Figure 2:
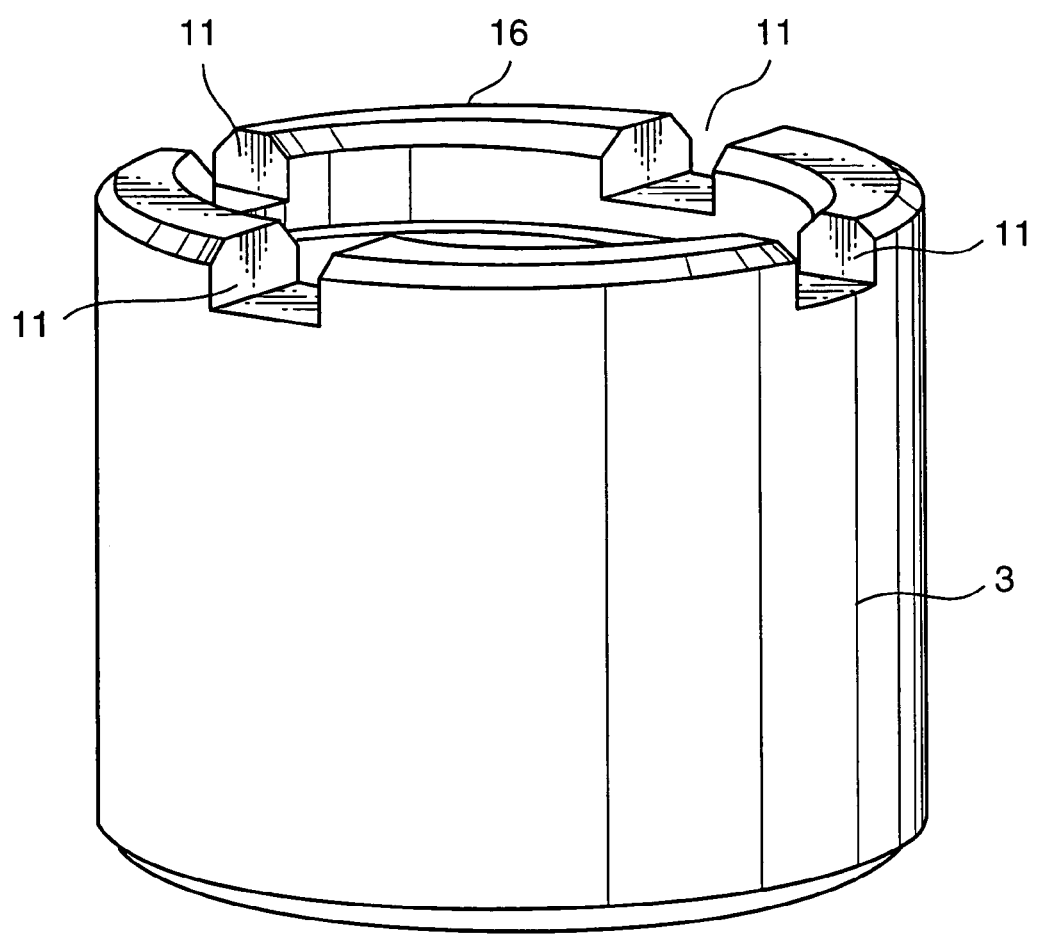
FIG. 2 is a perspective view showing an external configuration of the barrel of FIGS. 1A-1D.

The collimating lens 2 is fixed to one end surface of the cylindrical barrel 3. FIG. 2 shows an external configuration of the barrel 3. As shown in FIGS. 1A-1D and 2, a step is formed on one end surface of the barrel 3. An outer circumferential portion of the step located at a more radially outward position projects along a longitudinal axis, and an inner circumferential portion thereof located at a more radially inward position recedes along an axial direction. The collimating lens 2 is held while being accommodated inside the outer circumferential portion. A retracted surface 3a as an end surface of the inner circumferential portion is a flat surface normal to the optical axis O and is in surface contact with a flat surface 2a formed on a front surface (lens surface closer to the light source 20) of the collimating lens 2. Specifically, the retracted surface 3a of the barrel 3 forms a contact portion to be held in contact with the front surface of the collimating lens 2. The flat surface 2a is a ring-shaped surface formed along an outer circumference of the front surface of the collimating lens 2. Since the flat surface 2a has such a simple shape normal to the optical axis O, it can be easily formed upon molding the collimating lens 2.

The outer circumferential portion of the barrel 3 covers an outer circumferential surface 2b of the collimating lens 2 while leaving a tiny clearance to this outer circumferential surface 2b. This clearance takes up dimensional production errors of the collimating lens 2 and the barrel 3.

In a projecting surface 16 as an end surface of the outer circumferential portion of the barrel 3, rectangular grooves 11 are formed at a plurality of positions (four positions in FIGS. 1D and 2) symmetrical with respect to the optical axis O. The grooves 11 have the same width along a circumferential direction and are so formed as to cross the outer circumferential portion from an inner circumferential side to an outer circumferential side. Further, the grooves 11 are shallower than the retracted surface 3a. In other words, these grooves 11 are so formed in the projecting surface 16 as to have such a depth as not to reach the retracted surface 3a. By applying an adhesive 15 in these grooves 11, the adhesive 15 is applied at specified positions of the outer circumferential surface 2b of the collimating lens 2 and the collimating lens 2 is fixed in the barrel 3. Desirably, the outer circumferential surface 2b is secured to the barrel 3 by applying the adhesive 15 while a pressing force is applied to the collimating lens 2 to press the flat surface 2a of the collimating lens 2 against the retracted surface 3a of the barrel 3. In this way, the flat surface 2a and the flat surface 3a can be kept pressed against each other by a residual stress even after the adhesive 15 is solidified. It is desirable to apply a predetermined amount, e.g., 0.1 mg of the adhesive 15 using a precision measuring device such as a dispenser. The adhesive 15 is made of, for example, an acrylic resin. Preferably, a UV (ultraviolet) setting acrylic resin that does not require heating for solidification is used as material of the adhesive 15.

In this way, since the adhesive 15 for fixing the barrel 3 and the collimating lens 2 is locally preset at positions of the outer circumferential surface 2b symmetrical with respect to the optical axis O by forming the grooves 11, radial forces acting on the collimating lens 2 resulting from a temperature change cancel each other. Particularly, since widths of application areas of the adhesive 15 along the circumferential direction are evenly restricted by the grooves 11, the radial forces acting on the collimating lens 2 resulting from the temperature change can cancel each other with a satisfactory precision. As a result, a displacement of the collimating lens 2 along a radial direction, i.e. along a direction normal to the optical axis O resulting from the temperature change can be suppressed, thereby suppressing a displacement of the optical axis and a displacement of a detection spot. In order to more precisely cancel the radial forces from each other, it is desirable to apply the adhesive 15 to the grooves 11 at two positions as shown in FIG. 1D instead of applying it to the grooves 11 at four positions.

The adhesive 15 is applied to the outer circumferential surface 2b of the collimating lens 2, but not to the flat surface 2a as a contact surface with the barrel 3. Since the grooves 11 are formed to be shallower than the retracted surface 3a, the adhesive 15 applied in the grooves 11 can be prevented from flowing to between the flat surface 2a and the flat surface 3a held in contact with each other. Accordingly, the flat surfaces 2a and 3a are directly in contact without having the adhesive 15 therebetween. Thus, a variation in an amount of change of a distance from the emission point 1 of the light source 20 to the collimating lens 2 resulting from a temperature change due to influence of thermal expansion and contraction of the adhesive 15 can be solved.

Although the barrel holder main body 4 has a substantially cylindrical shape, a wall surface having a V-shaped cross section (hereinafter, V-shaped wall) is formed along a circumferential direction at a part of an inner circumferential surface of the barrel holder main body 4, and a leaf spring 13 is mounted at a position of this inner circumferential surface facing the V-shaped wall. The leaf spring 13 presses the cylindrical barrel 3 toward the V-shaped wall, whereby the barrel 3 is held at a specified position in the barrel holder main body 4. Particularly, a position of the barrel 3 can be determined at one position along a direction normal to the optical axis O. Since no adhesive is used to fix the barrel 3 to the barrel holder main body 4, there is no influence of expansion and contraction of adhesive resulting from a temperature change at a relative position between the barrel 3 and the barrel holder main body 4. As a result, a displacement of the optical axis and a displacement of the detection spot can be suppressed.

Further, since the collimating lens 2 is held in the barrel holder main body 4 via the barrel 3, the collimating lens 2 can be easily positioned with respect to a direction of the optical axis O. Particularly, it becomes possible to dispose the collimating lens 2 at a specified position by taking up dimensional production errors of the barrel 3 and other members. Since the leaf spring 13 is used to fix the barrel 3 to the barrel holder main body 4, the barrel 3 can be easily fixed.

It is assumed that ΔL denotes an amount of change of distance L from a reference surface to a position of the collimating lens 2 per unit temperature if a surface of the barrel holder bottom portion 5 in contact with the light source 20 is a reference surface (reference position). Here, since the front surface of the collimating lens 2 is in contact with an axial end surface of the barrel 3, the position of the collimating lens 2 means a held position of the collimating lens 2, i.e. a position of the flat surface 2a with respect to an axial direction. As described above, between the reference surface and the flat surface 2a of the collimating lens 2, only the barrel holder 30, made of the same material and having the same thermal expansion coefficient, is present and nothing made of a different material such as an adhesive is present. Since the front surface of the collimating lens 2 is in contact with the barrel 3, influence of thermal expansion and contraction of the collimating lens 2 made of a different material on the amount of change ΔL can be suppressed. Accordingly, the amount of change ΔL can be quantitatively understood only by a thermal expansion coefficient of the barrel holder 30.

The semiconductor laser device used as the light source 20 is such that a semiconductor chip is mounted on an electrically conductive material such as a copper clad stem. Accordingly, a member made of a material different from the barrel holder 30 is present between the reference surface and the emission point 1 of the semiconductor chip. Thus, it is necessary to individually consider an amount of change Δt of a distance t from the reference surface to the emission point 1 per unit temperature. The emission point 1 mentioned here means an end surface of the semiconductor chip with respect to the axial direction. Since no adhesive is present between the light source 20 and the barrel holder 30 as already mentioned, the amount of change Δt can be quantitatively understood by a thermal expansion coefficient of the light source 20. It should be noted that the distance t is, for example, about 1.3 mm.

A back focus f of the collimating lens 2, i.e. an amount of change Δf of focal length per unit temperature for producing the parallel beam 9 from the dispersed light 8 is partly specified by a change in a spherical shape of the collimating lens 2, i.e. a change in curvature resulting from a temperature change. Other factors for specifying the amount of change Δf include temperature dependency of a refractive index as a property of the glass material forming the collimating lens 2. As temperature goes up, a radius of curvature increases to lengthen the back focus f. As for the refractive index, even among glass materials suitable for the collimating lens 2, both, those whose refractive indices increase (to shorten the back focus f) as temperature goes up and those whose refractive indices decrease (to lengthen the back focus f) as temperature increase, are known.

By selecting a combination of a material for the barrel holder 30, a shape of the collimating lens 2 and material for the collimating lens 2, the amounts of change ΔL, Δt and Δf can be so adjusted as to satisfy: ΔL=Δf+Δt. Further, since the same member is used from the reference surface to the held position of the collimating lens 2 and no adhesive is present, such an adjustment can be precisely made. This suppresses deterioration in collimation quality of the parallel beam 9 emerged from the collimating lens 2 resulting from a temperature change.

Here, adjustment of the amount of change ΔL of the distance between the reference surface and the held position of the collimating lens 2 per unit temperature to a sum (Δf+Δt) of the amount of change Δf of the back focus per unit temperature and the amount of change Δt of the distance t from the reference surface to the emission point 1 per unit temperature means that the material for the barrel holder 30 and the barrel 3, the shape of the collimating lens 2 and the material for the collimating lens 2 are selected within such a range satisfying the following relational expression when ΔW [mλ/μm] denotes an amount of change in wavefront aberration per unit temperature caused by the difference between ΔL and (Δf+Δt) resulting from an ambient temperature change or the like:

$$\Delta W\{\Delta L-(\Delta f+\Delta t)\}<0.03[\lambda].$$

In other words, if the amount of change ΔW of the wavefront aberration can be suppressed to at most 0.03[λ] by suppressing the difference between the amount of change ΔL and the sum (Δf+Δt) to at most a specified value, recording and regeneration performances required for an optical head can be secured even if ambient temperature changes during normal use.

The above relationship, i.e. ΔL=Δf+Δt can be rewritten into ΔL−Δt=Δf. ΔL−Δt corresponds to an amount of change in the distance from the emission point 1 of the light source 20 to the collimating lens 2 per unit temperature. Accordingly, adjustment of the above three amounts of change is equivalent to an adjustment of the amount of change of the distance from the emission point 1 to the collimating lens 2 per unit temperature to the amount of change of the back focus of the collimating lens 2 per unit temperature.

The collimating lens 2 is preferably a composite lens consisting of a plurality of lenses as shown in FIGS. 1A-1D. These respective lenses forming the composite lens are secured to each other by an adhesive. Since the composite lens can take up a color aberration produced by a change in a light emission wavelength of the semiconductor laser device used in the light source 20 resulting from a temperature change, this is desirable in view of improving the collimation quality. Further, since lenses having various characteristics can be selected from a wide range for the collimating lens 2, there is an advantage of making it easier to adjust the amount of change of the distance from the emission point 1 to the collimating lens 2 per unit temperature and the amount of change of the back focus of the collimating lens 2 per unit temperature. However, a single lens can be used unless high precision is required.

Second Embodiment

Figure 3A:
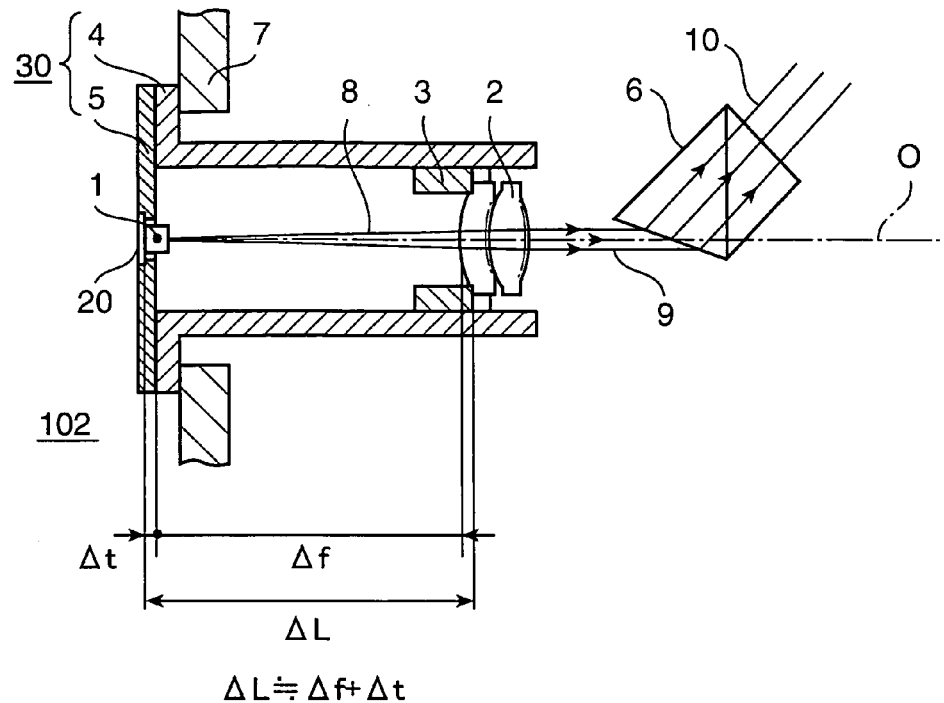
FIG. 3A is a sectional view schematically showing an entire construction of a beam shaping optical device according to a second embodiment of the present invention.
Figure 3B:
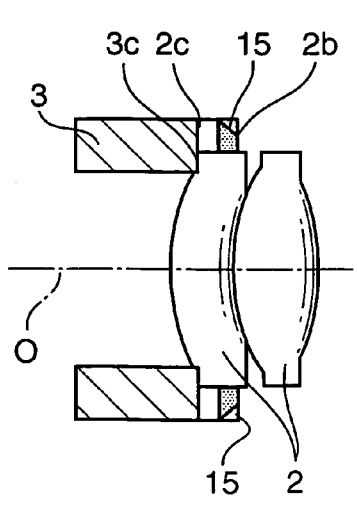
FIG. 3B is a sectional view showing a portion near a collimating lens.
Figure 3C:
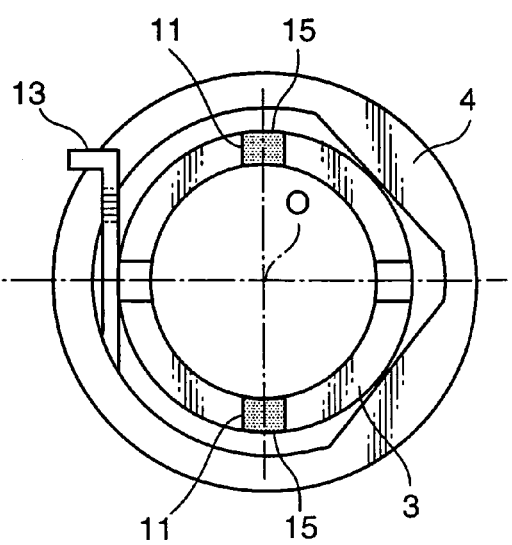
FIG. 3C is a side view of a barrel when viewed in a direction of an optical axis.

FIGS. 3A-3C are sections showing a construction example of a beam shaping optical device according to a second embodiment of the present invention. A beam shaping optical device 102 differs from the beam shaping optical device 101 of the first embodiment in that a retracted surface 3c of a barrel 3 is such a conical surface as to be closer to a light source 20 as it is closer to an optical axis O, and is in surface contact with a similar conical surface 2c provided on a front surface of a collimating lens 2. Accordingly, a position of the collimating lens 2 is determined at one position with respect to radial directions, i.e. directions normal to optical axis O. Thus, displacements of the collimating lens 2 along the directions normal to optical axis O can be more effectively suppressed. Therefore, a displacement of the optical axis and a displacement of a detection spot can be more effectively suppressed.

Since other construction functions and effects are same as in the first embodiment, no description is given thereon.

Third Embodiment

Figure 4:
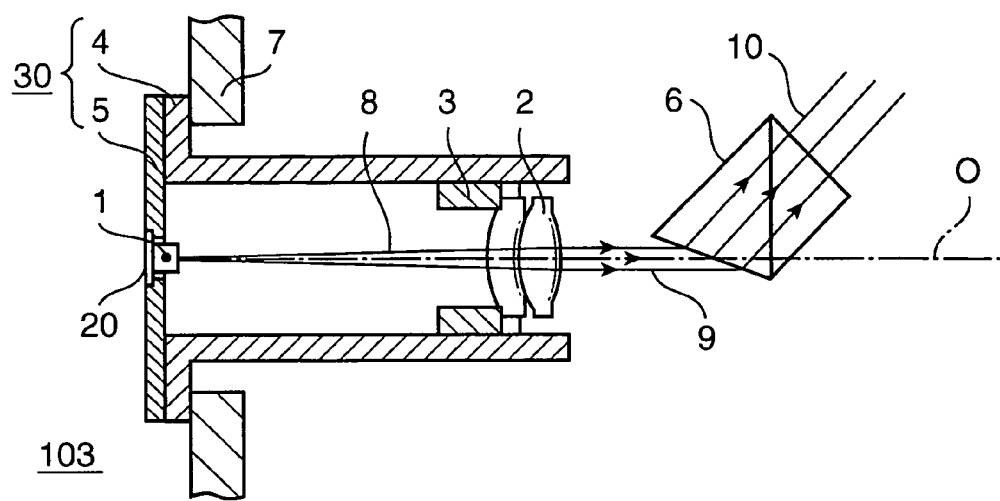
FIG. 4 is a sectional view of a beam shaping optical device according to a third embodiment of the present invention.
Figure 13A:
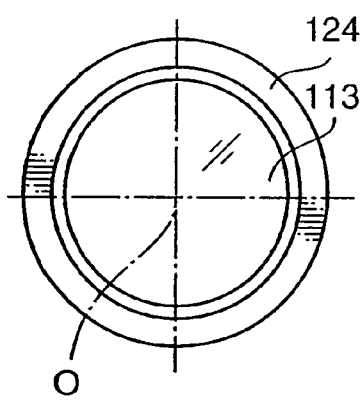
FIGS. 13A, 13B and 13C are diagrams showing a lens holding construction of a conventional optical head device.
Figure 13B:
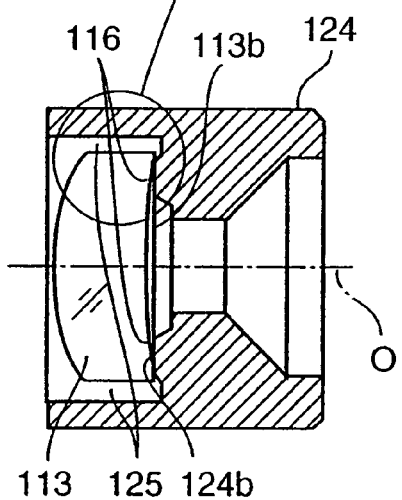
Figure 13C:
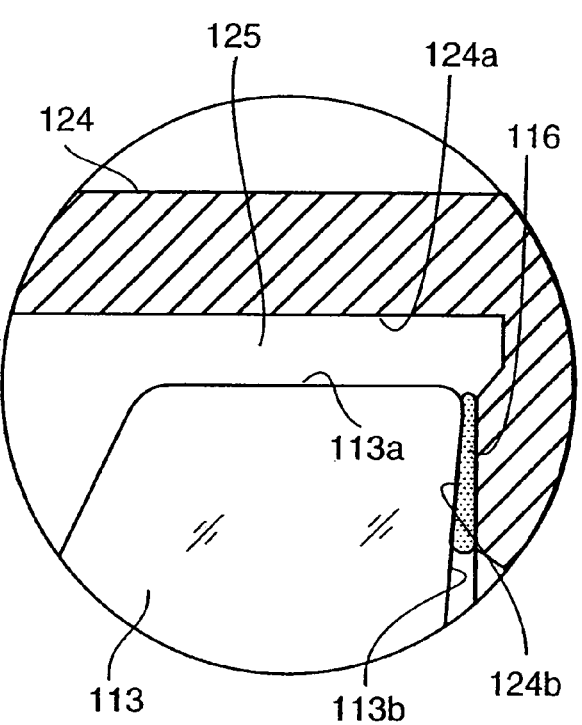
Figure 14:
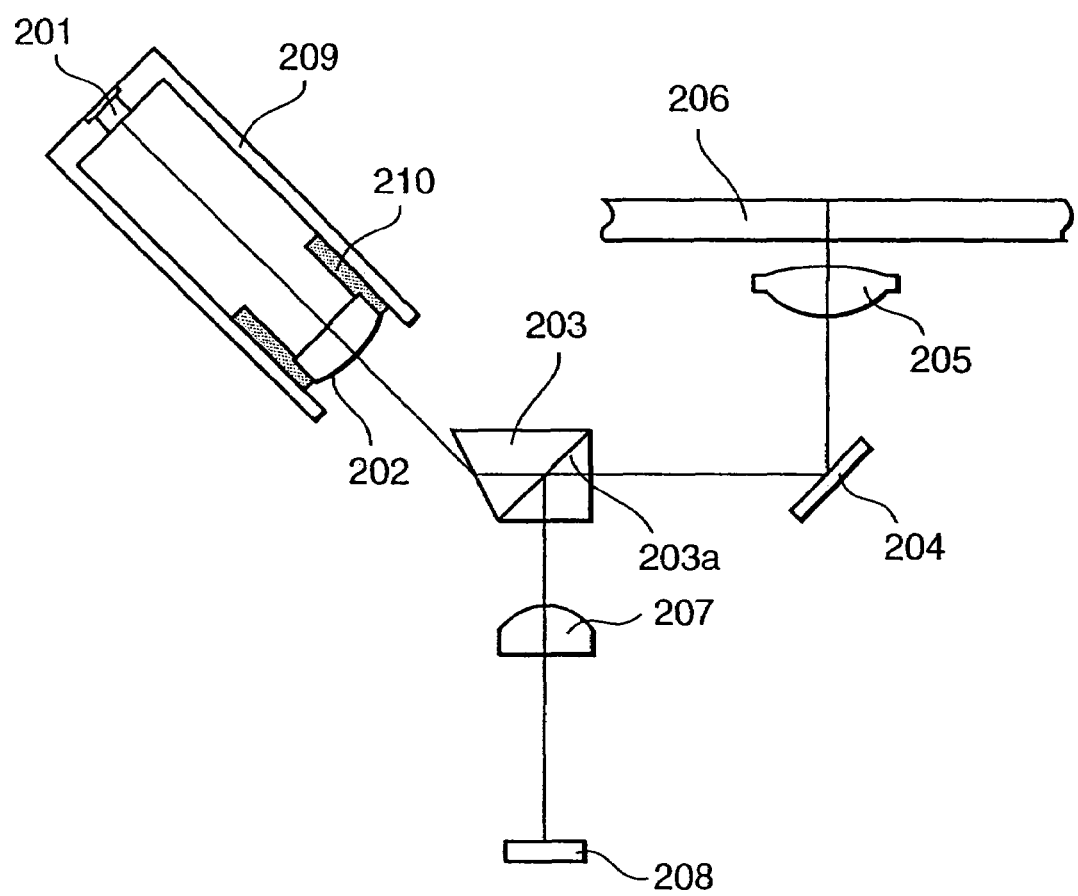
FIG. 14 is a diagram showing construction of an optical head device having a conventional beam shaping optical device.

FIG. 4 is a section showing a construction example of a beam shaping optical device according to a third embodiment of the present invention. This beam shaping optical device 103 differs from the prior art beam shaping optical device shown in FIG. 13 in that collimating lens 2 is a cemented lens comprised of a convex lens and a concave lens. The convex and concave lenses are respectively made of glass materials having different Abbe numbers and are achromatic lenses taking an achromatic construction having a smaller variation of a back focus resulting from a change in a refractive index of the glass material caused by a wavelength variation within such a range in which a wavelength of light source 20 changes according to a temperature and control current, e.g. within a range of an oscillating wavelength of ±10 nm. In a case that the collimating lens 2 does not take the achromatic construction as in the prior art, the back focus of the collimating lens 2 varies as the wavelength of the light source changes. As a result, parallelism of light having passed through the collimating lens 2 decreases, thereby producing astigmatism in the light having passed through the collimating lens 2 in beam shaping optical element 6.

An index called Marshall's evaluation criteria is generally used for aberrations of optical systems. According to this index, in a case that a parallel beam is satisfactorily gathered up to a diffraction limit by a lens, a wavefront aberration of the parallel beam is desirably at most $0.07\lambda$. In such a case, in view of other aberration components and tolerances of optical elements, astigmatism needs to be suppressed to at most $0.03\lambda$.

In order to attain an achromatic construction, it is known to be sufficient to set the Abbe number of a convex lens of a collimating lens larger than that of a concave lens. If materials of the convex and concave lenses are selected such that an astigmatism is at most $0.03\lambda$ within an oscillating wavelength range of ±10 nm, parallel beam 9 emerged from collimating lens 2 due to wavelength variation can be satisfactorily concentrated by a concentrating lens.

For example, S-FSL5 (Abbe number $v_d=70$) and S-LAH 60 (Abbe number $v_d=35$) produced by K. K. Ohara can be used as material for the convex lens and that for the concave lens satisfying the above condition, respectively.

As temperature of the entire optical system shown in FIG. 4 changes, a distance between the collimating lens 2 and the light source 20 changes due to thermal expansions of barrel holder 30 and the barrel. At this time, a focal length and back focus of the collimating lens 2 change due to a change in an oscillating wavelength of the light source 20 in relation to temperature, thermal expansion of the collimating lens 2, and changes in refractive indices of the materials of the collimating lens 2 in relation to temperature. In this case, a focal position of the collimating lens 2 and a position of an emission point of the light source do not match up unless an amount of change in distance between the collimating lens 2 and the light source 20, and an amount of change in the back focus of the collimating lens 2 resulting from the temperature change of the entire optical system within an operating temperature range, are the same. As a result, parallelism of the parallel beam 9 emerged from the collimating lens 2 decreases.

Since the distance between the collimating lens 2 and the light source 20 becomes longer due to the thermal expansion of the optical system as the temperature of the entire optical system increases, a reduction in the parallelism of the parallel beam 9 emerged from the collimating lens 2 can be suppressed if the back focus of the collimating lens 2 increases at the same rate as the distance between the collimating lens 2 and the light source 20 as the temperature increases.

In the convex lens of the collimating lens 2, a refracting power thereof decreases due to a reduction in the refractive index of the glass material of the convex lens since an oscillating wavelength of the light source 20 becomes longer as the temperature of the optical system increases. Thus, the back focus of the collimating lens 2 becomes longer. However, if the achromatic condition is satisfied, it is not possible to sufficiently increase the back focus because it is more advantageous to increase the Abbe number of the convex lens. Even in such a case, if a change $\Delta n/\Delta T$ in the refractive index of the convex lens material in relation temperature is negative, the refractive index of the convex lens decreases as the temperature increases. Thus, the back focus can be made longer, and elongation of the back focus due to this decreased refractive index can be made larger.

In the concave lens of the collimating lens 2, the refractive index of the glass material thereof decreases because the oscillating wavelength of the light source 20 becomes longer as the temperature of the optical system increases. Thus, the back focus of the collimating lens 2 is reduced. However, if the achromatic condition is satisfied, it is more advantageous to decrease the Abbe number of the convex lens. Accordingly, a reduction in the refractive index caused by elongation of the oscillating wavelength of the light source 20 cannot be made smaller, whereby a reduced amount of the back focus cannot be sufficiently suppressed. However, if a change $\Delta n/\Delta T$ in the refractive index of the concave lens material in relation to temperature is positive, reduction in the refractive index of the concave lens due to a temperature increase can be suppressed. Thus, a reduced amount of the back focus can be compensated.

Upon a temperature increase, the back focus is increased by the convex lens or the concave lens, or the convex lens and the concave lens, whereby a difference between an amount of change in the distance between the collimating lens 2 and the light source 20 and an amount of change in the back focus of the collimating lens 2 resulting from a temperature change can be suppressed to thereby suppress a reduction in collimation quality of the parallel beam 9 emerged from the collimating lens 2 resulting from a temperature change.

Specifically, if it is assumed that W [$\lambda$], $\Delta f_b/\Delta T$ [mm/° C.] and $\Delta L/\Delta T$ [mm/° C.] denote wavelength aberration in relation to a change in the distance between the light source 20 and the collimating lens 2, an amount of change in the back focus of the collimating lens 2 in relation to temperature when the beam shaping optical device 103 undergoes a temperature change $\Delta T$, and a change in the distance between the light source 20 and the collimating lens 2 due to thermal expansions of the barrel 3 and the barrel holder 30, materials for the respective lens are so selected as to satisfy the following equation 1) at an operating temperature T of the beam shaping optical device 103 when normal temperature is $T_0$:

$$W(|(\Delta f_b/\Delta T - \Delta L/\Delta T) \cdot (T-T_0)|) < 0.03[\lambda] \qquad 1).$$

The right side of this inequality is set at 0.03 because a wavefront aberration needs to be at most $0.03\lambda$, which is smaller than $0.07\lambda$ given by the Marshall's evaluation criteria, in view of other aberration components and tolerances of optical elements.

As a specific example, a relationship between an extent of aberration caused and changes in the refractive indices of the materials of the convex and concave lenses of the collimating lens 2 in relation to temperature when the beam shaping optical device 103 of FIG. 4, used in an optical head for a Blue-ray disc having a wavelength of 408 nm, underwent a temperature change from 25° C. (normal temperature) to 60° C. was numerically calculated. The changes in the refractive indices in relation to temperature were calculated within a range of general optical glass materials ($-6\times10^{-6}$ to $12\times10^{-6}$ [/° C.]). It should be noted that the collimating lens 2 is an achromatic lens having a focal length of 7 mm in the beam shaping optical device 103 of FIG. 4.

Figure 5:
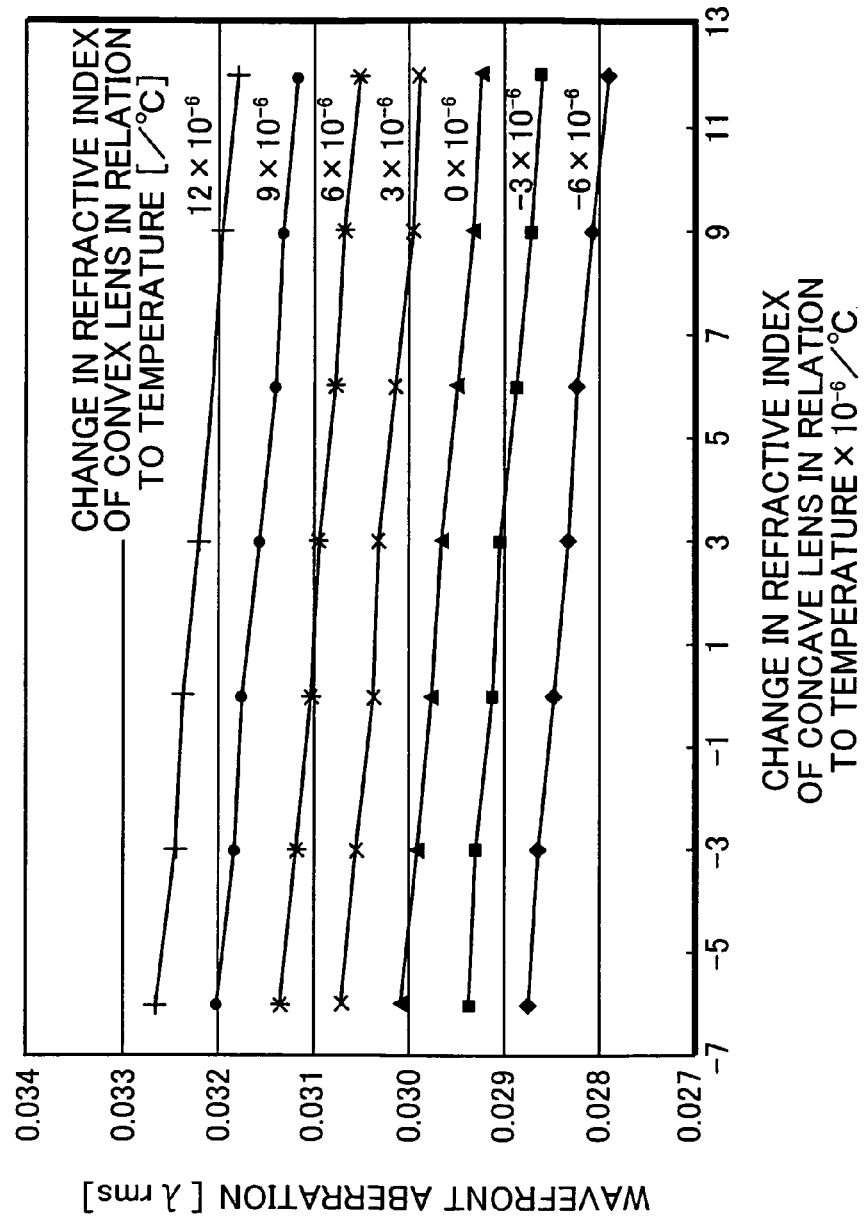
FIG. 5 is a characteristic graph showing a relationship of an amount of aberration produced and changes in refractive indices of materials of a concave lens and a convex lens forming a collimating lens resulting from a temperature change when the beam shaping optical device according to the third embodiment of the present invention undergoes a temperature change of from 25° C. to 60° C.
Figure 6:
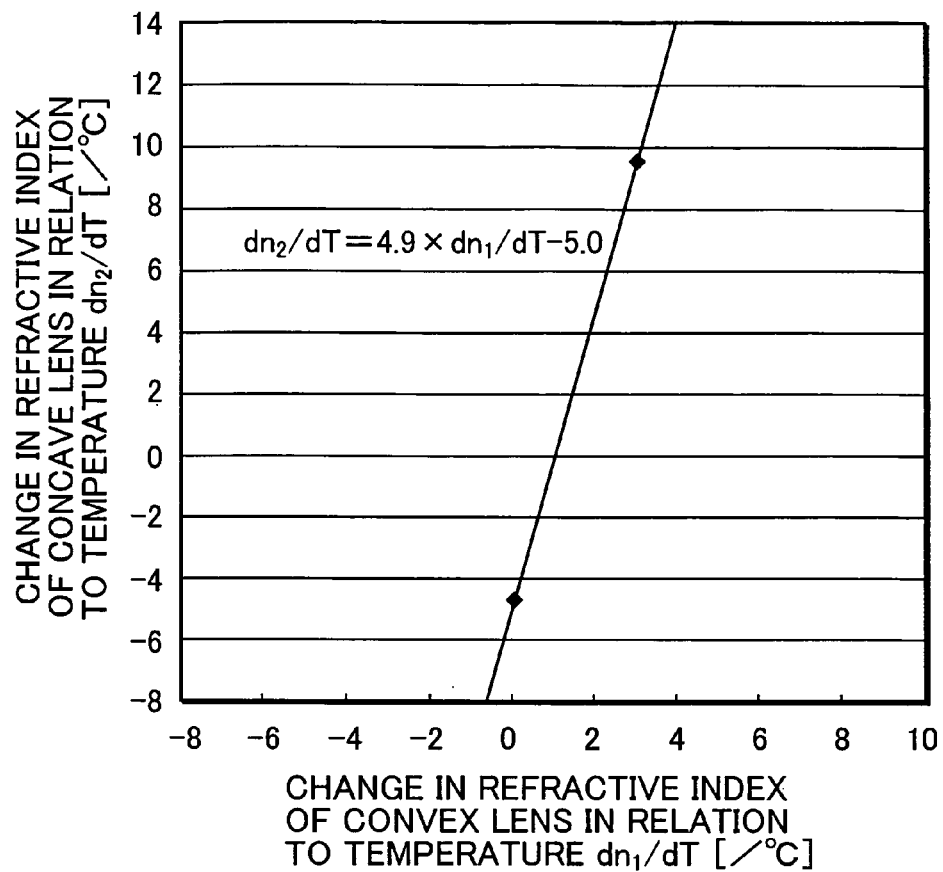
FIG. 6 is a characteristic graph showing a relationship of changes in the refractive indices of the materials of the concave lens and the convex lens if an amount of aberration is $0.03\lambda$ upon a temperature change of from 25° C. (normal temperature) to 60° C. in the beam shaping optical device according to the third embodiment of the present invention.

These calculation results are shown in FIGS. 5 and 6. In FIG. 5, the horizontal axis represents change in the refractive index of the concave lens in relation to temperature and the vertical axis represents wavefront aberration. As shown in FIG. 5, the change in the refractive index of the material of the convex lens in relation to temperature is better to be smaller and the change in the refractive index of the materiel of the convex lens in relation to temperature is desirably negative or substantially zero, e.g. at most $2\times10^{-6}$ in order to satisfy equation 1). Further, the extent of aberration can be reduced by using a concave lens having a maximum change in the refractive index of the material thereof in relation to temperature.

FIG. 6 is a graph showing a relationship between the changes in the refractive indices of the materials of the concave and convex lenses in relation to temperature in a case that the aberration was 0.03λ when the beam shaping optical device 103 of FIG. 4 underwent the temperature change from 25° C. (normal temperature) to 60° C. As shown in this graph, a condition defined by equation 1) holds if a change $dn_1/dT$ in the refractive index of the material of the convex lens in relation to temperature and a change $dn_2/dT$ in the refractive index of the material of the concave lens in relation to temperature, satisfy following equation 2):

$$dn_2/dT > 4.9 \times dn_1/dT - 5.0 \qquad 2),$$

whereby a reduction in collimation quality of light emerged from the beam shaping optical device 103 can be reduced.

Although the example was shown for an optical head for a Blu-ray disc in FIGS. 5 and 6, similar results can be obtained regardless of the focal length or the refractive indices of the materials of the lenses if the collimating lens is an achromatic lens. For example, S-FSL5 (change $\Delta n/\Delta T$ in the refractive index in relation to temperature=0 (wavelength: 400 nm) and the like can be used as the material for the convex lens satisfying the above condition, and S-LAH60 (change $\Delta n/\Delta T$ in the refractive index in relation to temperature=10.3 (wavelength: 400 nm) and the like can be used as the material for the concave lens.

Further, parallel beam 9 having less aberration in relation to the wavelength variation of the light source 20 can be obtained if spherical shapes of the respective lenses forming the collimating lens 2 are optimized at an effective aperture of the collimating lens 2, such that a change $\Delta W/\Delta\lambda$ in the wavefront aberration $W[\lambda]$ of the collimating lens 2 resulting from the variation of the wavelength λ of the light source is equal to or below half the Marshall's evaluation criteria, e.g. $|\Delta W/\Delta\lambda|<0.03$ [λ/nm].

In an optical system of an optical head for recording and regenerating information in and from an optical disc medium, such as a CD, a DVD or a Blu-ray disc, the distance between the light source 20 and the collimating lens 2 is about 0.5 to 1 times the focal length f if the focal length of the collimating lens 2 is f [mm]. If an optical base holding the collimating lens 2 and the light source 20 is made of aluminum or a like metal that undergoes a large linear expansion, the distance between the collimating lens 2 and the light source 20 becomes approximately $f\times10^{-5}\times\Delta T$ to $2\times f\times10^{-5}\times\Delta T$ [mm·° C.] when the beam shaping optical device 103 undergoes a temperature change $\Delta T$ since a coefficient of linear expansion is about $2\times10^{-6}$ [/° C.] in this case. Here, if the unit of f is [μm], the distance between the collimating lens 2 and the light source 20 in relation to temperature is about 0.01×f to 0.02× f [μm/° C.].

Accordingly, if the amount of change $\Delta f_b/\Delta T$ in the back focus of the collimating lens 2 in relation to temperature when the beam shaping optical device 103 undergoes the temperature change $\Delta T$ is large in relation to the distance between the light source 20 and the collimating lens 2, i.e. $|\Delta f_b/\Delta T|>1193$ 0.01×f [μm/° C.], an occurrence of astigmatism can be suppressed by using materials having larger coefficients of linear expansion, e.g. a metallic material such as copper or aluminum (coefficient of linear expansion: $1\times10^{-5}$ to $2\times10^{-6}$ [/° C.]) as materials for the barrel 3 and the barrel holder 30. On the other hand, if the amount of change $\Delta f_b/\Delta T$ in the back focus in relation to temperature is small, i.e. $|\Delta f_b/\Delta T|\leq 0.01\times f$ [μm/° C.], an occurrence of astigmatism can be suppressed by using materials having smaller coefficients of linear expansion, e.g. a ceramic or a glass (coefficient of linear expansion: $1\times10^{-5}$ [/° C.] or smaller) as materials for the barrel 3 and the barrel holder 30.

If being made of the same material in FIG. 4, the barrel 3 and the barrel holder 30 similarly expand and contract upon a change in ambient temperature. Accordingly, deformations of the barrel 3 and the collimating lens 2 caused by heat can be suppressed, thereby suppressing a wavefront aberration of the parallel beam 9 and inclination of the optical axis. In this case, a metal such as aluminum, iron or copper, or a resin such as a polycarbonate can be used as the material for the barrel 3 and the barrel holder 30.

If the beam shaping optical device 103 of this embodiment is used as a beam shaping optical device for an optical head used in an optical disc driving device, an optical head and an optical disc device stable against wavelength variation of the light source 20 and temperature change can be constructed. Particularly in a case that the wavelength of the light source 20 lies within a range of 300 nm to 500 nm, this is effective since a change in the refractive index in relation to wavelength is large in general optical materials. In the beam shaping optical device 103, astigmatism can be produced by displacing a focal position of the collimating lens 2 and a position of the emission point of the light source 20. A light concentrating property of the optical head can be further improved by arranging the collimating lens 2 at such a displaced position as to cancel astigmatism inherent to the optical head.

In this embodiment, there are cases where a positional relationship of the collimating lens 2 and the light source 20 changes due to a temperature change to incline light emerged from the collimating lens 2. In such a case, an off-axis characteristic can be improved by designing either the concave lens or the convex lens or both the concave lens and the convex lens, to be aspherical lenses to satisfy a sinusoidal condition. Thus, influence of inclination of the lens can be mitigated.

Since other construction functions and effects are same as in the first embodiment, no description is given thereon.

Fourth Embodiment

Figure 7:
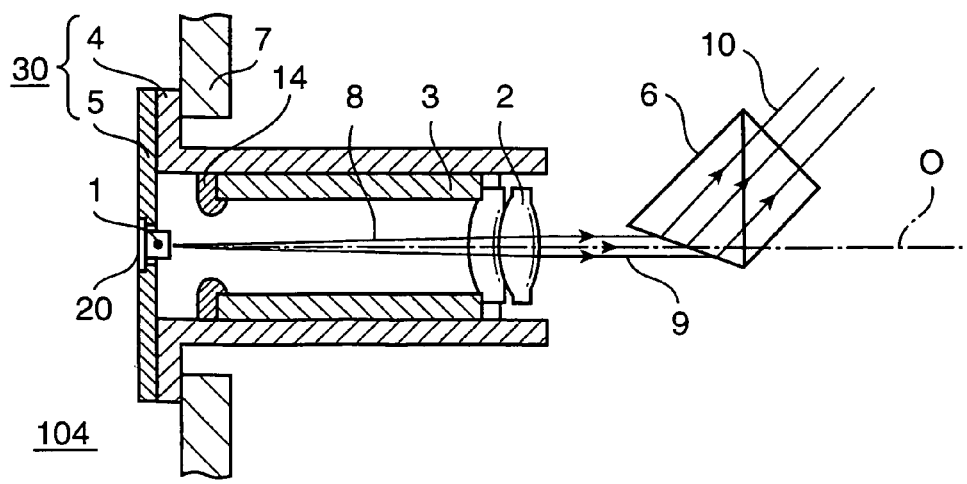
FIG. 7 is a sectional view of a construction of a beam shaping optical device according to a fourth embodiment of the present invention.

FIG. 7 is a section schematically showing a construction example of a beam shaping optical device 104 according to a fourth embodiment of the present invention. In a case of selecting a glass material in view of production tolerance and color dispersion of collimating lens 2, an amount of change in focal length of the collimating lens 2 resulting from a temperature change may not be sufficiently large in the third embodiment. In such a case, as shown in FIG. 7, collimating lens 2 is fixed to barrel 3 made of a material having a smaller coefficient of linear expansion, e.g. a glass, a ceramic or a like material having a coefficient of linear expansion of at most $10^{-5}$, and an end of the barrel 3 closer to the light source 20 is fixed to a barrel holder main body 4 by a securing portion 14, thereby reducing an amount of change in a distance between the collimating lens 2 and the light source 20 resulting from a temperature change of the beam shaping optical device 104. Thus, an amount of astigmatism in the beam shaping optical device 104 can be suppressed to a smaller level, e.g. to at most 0.03λ.

Further, if a difference in the coefficient of linear expansion between the collimating lens 2 and the barrel 3 is small, e.g. at most $10^{-6}$, the collimating lens 2 and the barrel 3 similarly expand as temperature increases. Thus, displacement and distortion of the collimating lens 2 caused by distortion of the barrel 3 resulting from a temperature change can be suppressed, thereby improving stability of a temperature characteristic of the collimating lens 2.

Similar effects can be obtained by fixing the collimating lens 2 at a surface closest to the light source 20 out of edge surfaces of the collimating lens 2, and adjusting a distance between a fixed part and the light source 20 to be shorter to suppress a change in the distance between the collimating lens 2 and the light source 20 caused by expansion/contraction of the barrel holder main body 4 resulting from a temperature change in the third embodiment.

Since other construction functions and effects are same as in the first embodiment, no description is given thereon.

Fifth Embodiment

Figure 8:
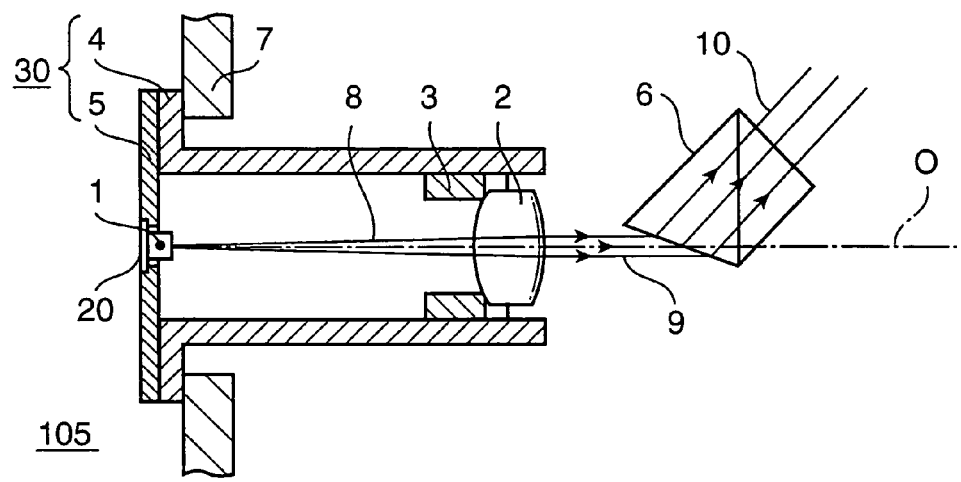
FIG. 8 is a sectional view of a construction of a beam shaping optical device according to a fifth embodiment of the present invention.

FIG. 8 is a section schematically showing a construction example of a beam shaping optical device 105 according to a fifth embodiment of the present invention. A single lens is used as collimating lens 2 as shown in FIG. 8, and this collimating lens 2 is made of a material having a larger Abbe number (e.g. at least 55) at a wavelength of light source 20 so that a back focus varies to a smaller extent (e.g. at most 0.002 mm) at and near the wavelength of the light source 20, e.g. in an oscillating wavelength range of ±10 nm.

Since the collimating lens 2 has a larger Abbe number, a refractive index thereof decreases to a smaller extent upon variation of the oscillating wavelength of the light source 20 resulting from a temperature increase of the optical system. Accordingly, a back focus of the convex lens also decreases to a smaller extent. Thus, if a change Δn/ΔT in a refractive index of lens material of the convex lens in relation to temperature is negative, the back focus can be increased, thereby being able to suppress a reduction in quality of parallel beam 9 by temperature. Further, by making the collimating lens 2, barrel 3 and barrel holder main body 4 of materials whose coefficients of linear expansion differs from each other substantially by the same amount (e.g. at most $10^{-6}$), a distortion of the optical system resulting from a temperature change due to differences in the coefficient of linear expansion between the lens material, the barrel 3 and the barrel holder main body 4 can be suppressed, whereby a reduction in quality of the parallel beam 9 can be suppressed.

For example, Photaron (produced Sumita Optical Glass Inc.) can be used as the lens material for the collimating lens 2, and ceramic materials can be used as the barrel 3 and the barrel holder main body 4.

Since other construction functions and effects are same as in the first embodiment, no description is given thereon.

Sixth Embodiment

Figure 9:
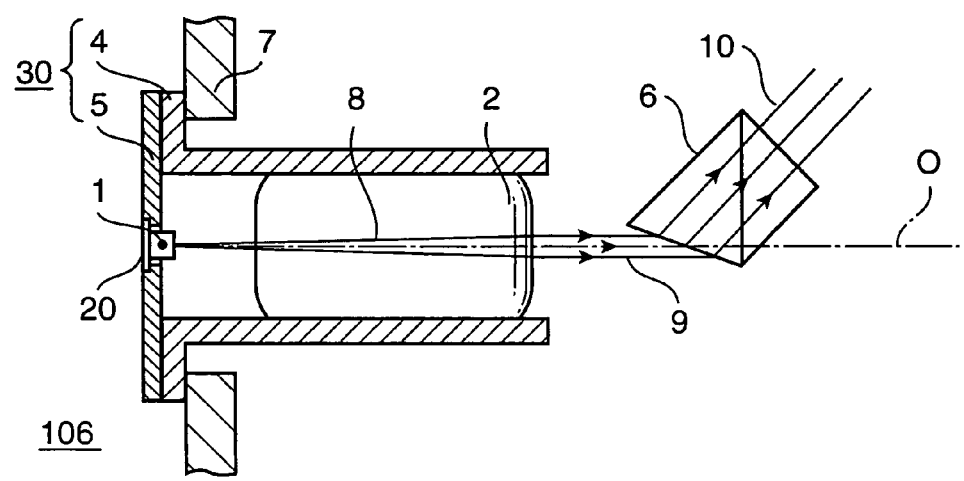
FIG. 9 is a sectional view of a construction of a beam shaping optical device according to a sixth embodiment of the present invention.

FIG. 9 is a section schematically showing a construction example of a beam shaping optical device 106 according to a sixth embodiment of the present invention. If a thickness of collimating lens 2, i.e. spacing between surfaces of the collimating lens 2 along a direction of optical axis O is increased to about 0.5 to 1 times a focal length of the collimating lens 2 as shown in FIG. 9, the collimating lens 2 can be stably adjusted and fixed without any barrel. This can suppress influence of a reduction in quality of parallel beam 9 caused by distortion of a lens barrel resulting from a temperature change of the optical system.

Further, by setting differences in linear expansion coefficient between material of the collimating lens 2 and the barrel holder main body 4 substantially equal (e.g. at most $10^{-6}$), a distortion of the optical system resulting from a temperature change due to differences in the linear expansion coefficient between these respective materials can be suppressed, whereby a reduction in quality of the parallel beam 9 can be suppressed.

Although the single lens is used in this embodiment shown in FIG. 9, a combination lens can also provide similar effects.

Since other construction functions and effects are same as in the first embodiment, no description is given thereon.

Seventh Embodiment

Figure 10:
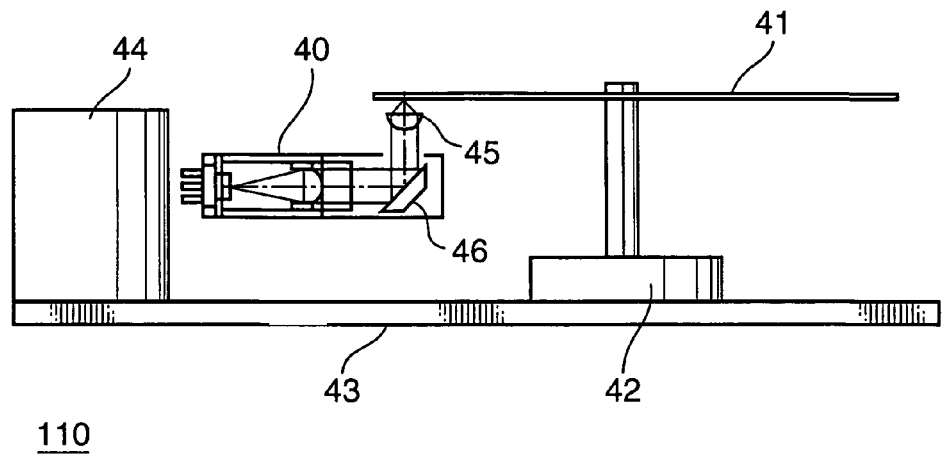
FIG. 10 is a schematic side view of an optical information medium driving unit according to a seventh embodiment of the present invention.
Figure 11:
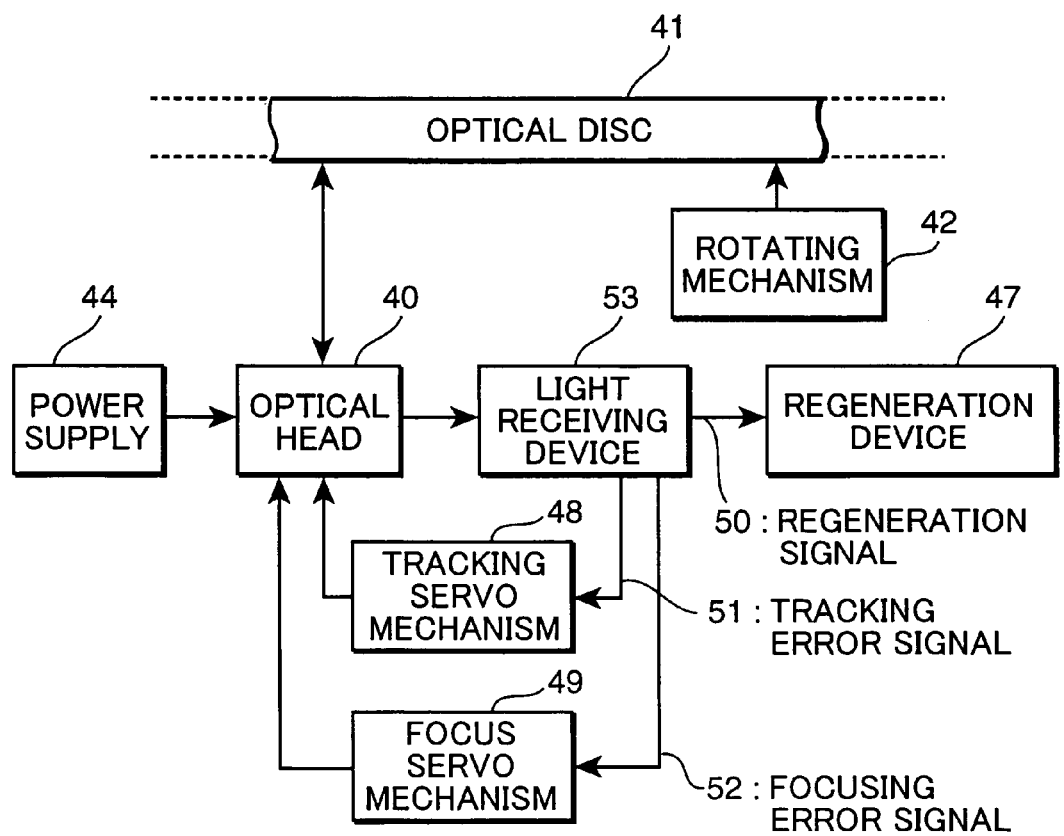
FIG. 11 is a block diagram of the optical information driving unit of FIG. 10.

FIG. 10 is a side view and FIG. 11 is a block diagram showing a schematic construction of an optical information medium driving unit according to one embodiment of the present invention. This optical information medium driving unit 110 is provided with an optical head 40, a rotating mechanism 42, a circuit board 43, a power supply 44, a light receiving device 53, a regeneration device 47, a tracking servo mechanism 48 and a focus servo mechanism 49.

The optical head 40 includes, for example, the beam shaping optical device 101 according to the first embodiment, a rising mirror 46 for converting a light propagating direction, an objective lens 45 for convergence of a light onto a recording surface of an optical disc (optical information medium) 41, and a half mirror (not shown) for branching a path of a reflected light from the recording surface of the optical disc 41 off from a path of an incident light and causing the reflected light to be incident on the regeneration device 47. It should be noted that any one of the beam shaping optical devices according to the second to sixth embodiments may be used.

The half mirror is inserted on a path of a light emerged from collimating lens 2 to the objective lens 45. Information is recorded, deleted and read by a light emerged from the objective lens 45 of the optical head 40 and concentrated on the recording surface of the optical disc 41. A semiconductor laser device used as light source 20 is desirably provided with a monitoring electrode (electrode for extracting a signal created by light emission after detection by a photodiode or the like), in addition to a ground electrode and a laser diode electrode as shown in FIG. 10 so as to be able to control a current applied from the circuit board 43 to the laser diode.

The rotating mechanism 42 includes a motor (not shown) for rotating the optical disc 41 mounted on a shaft. The circuit board 43 includes various circuit elements (not shown) and serves as one constructing element of the regeneration device 47, the tracking servo mechanism 48 and the focus servo mechanism 49. As described above, the circuit board 43 supplies a controlled current to the optical head 40. The power supply 44 supplies a power to the circuit board 43, the rotating mechanism 42 and the like. The light receiving device 53 generates a regeneration signal 50, a tracking error signal 51 and a focusing error signal 52 in accordance with reflected light split by the optical head 40.

The regeneration device 47 regenerates information recorded in the optical disc 41 in accordance with the regeneration signal 50 and, if this information is, for example, video image information and sound information, the regeneration device 47 converts this information into a video image signal and a sound signal. The video image signal is displayed as a video image by being inputted to a monitor (not shown), whereas the sound signal is outputted as a sound by being inputted to a loudspeaker (not shown). The tracking servo mechanism 48 controls the optical head 40 in such a manner as to compensate for a tracking error in accordance with the tracking error signal 51. Similarly, the focus servo mechanism 49 controls the optical head 40 in such a manner as to compensate for a focusing error in accordance with the focusing error signal 52.

Since the optical head 40 and the optical information medium driving unit 110 include the beam shaping optical device 101, displacement of a spot position for recording or regenerating information according to an ambient temperature change can be prevented in a case of optically recording the information in the optical disc 41 or optically regenerating the information in the optical disc 41. In other words, the optical head 40 and the optical information medium driving unit 110 can precisely record and regenerate the information and perform tracking control even if an ambient temperature changes, thereby functioning as devices highly stable and reliable against a temperature change.

Eighth Embodiment

Figure 12:
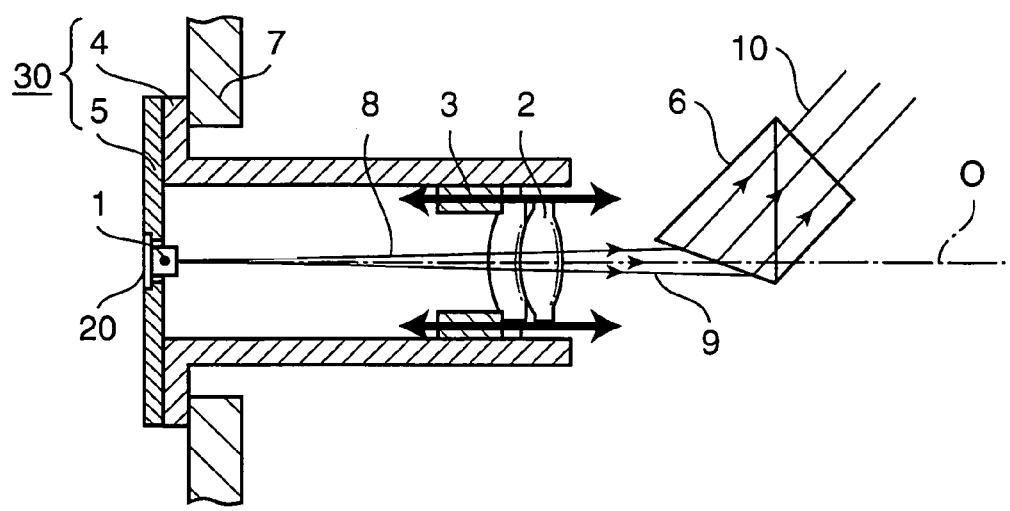
FIG. 12 is a sectional view schematically showing a construction of a beam shaping optical device according to an eighth embodiment of the present invention.

FIG. 12 is a section showing a schematic construction example of a beam shaping optical device according to an eighth embodiment of the present invention. As shown in FIG. 12, a barrel 3 holding a collimating lens 2 is arranged such that a light source 20 is displaced from a focal position of the collimating lens 2 along a direction of an optical axis. Thus, astigmatism is produced in a parallel beam emerged from a beam shaping optical device 6. Generally, in an optical head, an element for causing astigmatism is present on a light path along which a parallel beam emerged from a beam shaping optical element passes. Therefore, aberration of the optical head in its entirety can be reduced and a light concentrating performance of the optical head can be improved by causing the astigmatism in the beam shaping optical element in such a manner as to counteract the astigmatism caused by that element. An initial amount of the astigmatism in this case is preferably at most 10 mλ at which characteristics (e.g. recording/regeneration characteristic, drop impact resistance) of the optical head can be ensured.

Since other construction functions and effects are same as in the first embodiment, no description is given thereon.

This application is based on Japanese patent application serial No. 2003-271801, filed in Japan Patent Office on Jul. 8, 2003, and Japanese patent application serial No. 2003-312894, filed in Japan Patent Office on Sep. 4, 2003, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

INDUSTRIAL APPLICABILITY

The present invention is applicable to a beam shaping optical device required to record and regenerate information against an ambient temperature change, and an optical head and an optical information medium driving unit using this device.

What is claimed is:

1. An optical device comprising:
   a base;
   a barrel holder held on said base;
   a light source held in said barrel holder;
   a barrel held in said barrel holder; and
   a collimating lens held in said barrel for converting a beam emitted from said light source into a parallel beam, said collimating lens including at least two lenses, with one of said at least two lenses being a convex lens and another of said at least two lenses being a convex lens, and with a change in a refractive index of material of said convex lens in relation to temperature being substantially zero or negative,
   wherein said barrel includes a contact portion held in contact with a front surface of said collimating lens that is closer to said light source than is a rear surface of said collimating lens.

2. The optical device according to claim 1, wherein said collimating lens is adhered to said barrel by an adhesive applied at positions of an outer circumferential surface of said collimating lens which are symmetrical with respect to an optical axis.

3. The optical device according to claim 2, wherein one end of said barrel is stepped such that an outer circumferential portion of said barrel axially extends more than does an inner circumferential portion of said barrel, with said inner circumferential portion defining said contact portion, and with said outer circumferential portion having therein grooves at positions symmetrical with respect to the optical axis, said grooves having the same width along a circumferential direction and extending from an inner circumferential side of said outer circumferential portion toward an outer circumferential side of said outer circumferential portion, and
said adhesive is in said grooves.

4. The optical device according to claim 3, wherein said grooves do not reach said inner circumferential portion.

5. The optical device according to claim 1, wherein a difference, between an amount of change in a distance from a specified reference position in said barrel holder to said front surface of said collimating lens per unit temperature and a sum of an amount of change in movement of said light source from the reference position per unit temperature plus an amount of change in back focus of said collimating lens per unit temperature, is set to be equal to or below a specified value.

6. The optical device according to claim 1, wherein
said contact portion is held in contact with said front surface of said collimating lens by being directly held in contact with said front surface of said collimating lens without an adhesive.

7. The optical device according to claim 1, wherein
said contact portion comprises a flat surface such that said contact portion is held in contact with said front surface of said collimating lens by having said flat surface held in contact with a flat surface portion provided on said front surface of said collimating lens.

8. The optical device according to claim 1, wherein
an Abbe number of said material of said convex lens at a wavelength of said light source is larger than an Abbe number of material of said concave lens at the wavelength, and when $\lambda$[nm], W[$\lambda$] and $\Delta W/\Delta\lambda$ denote the wavelength of said light source, a wavefront aberration of said collimating lens, and a change in the wavefront aberration caused by a wavelength change, respectively, at an effective aperture of said collimating lens $\Delta W/\Delta\lambda$ satisfies the expression $|\Delta W/\Delta\lambda|<0.03$ [$\lambda$/nm].

9. The optical device according to claim 1, wherein
said collimating lens has a thickness that is from 0.5 to 1 times a focal length of said collimating lens.

10. The optical device according to claim 1, wherein
said barrel and said barrel holder are made of the same material.

11. The optical device according to claim 1, wherein
said barrel and said barrel holder are made of different materials, respectively, with a difference between coefficients of linear expansion of said different materials being at most $10^{-6}$[/° C.].

12. The optical device according to claim 1, wherein
said collimating lens, said barrel and said barrel holder are made of different materials, respectively, and differences between coefficients of linear expansion of respective said different materials are at most $10^{-6}$[/° C.].

13. The optical device according to claim 1, wherein
a wavelength of said light source is at least 300 nm and at most 500 nm.

14. An optical device comprising:
a base;
a barrel holder held on said base;
a light source held in said barrel holder;
a barrel held in said barrel holder; and
a collimating lens held in said barrel for converting a beam emitted from said light source into a parallel beam, said collimating lens including at least two lenses, with one of said at least two lenses being a convex lens and another of said at least two lenses being a convex lens, and with a change in a refractive index of material of said concave lens in relation to temperature being positive,
wherein said barrel includes a contact portion held in contact with a front surface of said collimating lens that is closer to said light source than is a rear surface of said collimating lens.

15. The optical device according to claim 14, wherein
an Abbe number of material of said convex lens at a wavelength of said light source is larger than an Abbe number of said material of said concave lens at the wavelength, and when $\lambda$[nm], W[$\lambda$] and $\Delta W/\Delta\lambda$ denote the wavelength of said light source, a wavefront aberration of said collimating lens, and a change in the wavefront aberration caused by a wavelength change, respectively, at an effective aperture of said collimating lens $\Delta W/\Delta\lambda$ satisfies the expression $|\Delta W/\Delta\lambda|<0.03$ [$\lambda$/nm].

16. An optical device comprising:
a base;
a barrel holder held on said base;
a light source held in said barrel holder;
a barrel held in said barrel holder; and
a collimating lens held in said barrel for converting a beam emitted from said light source into a parallel beam, said collimating lens including at least two lenses, with one of said at least two lenses being a convex lens and another of said at least two lenses being a convex lens, and when $dn_1/dT$ and $dn_2/dT$ denote a change in a refractive index of material of said convex lens in relation to temperature and a change in a refractive index of material of said concave lens in relation to temperature, respectively, $dn_1/dT$ and $dn_2/dT$ satisfy the expression $dn_2/dT>4.9\times dn_1/dT-5.0$, wherein said barrel includes a contact portion held in contact with a front surface of said collimating lens that is closer to said light source than is a rear surface of said collimating lens.

17. An optical device comprising:
a base;
a barrel holder held on said base;
a light source held in said barrel holder;
a barrel held in said barrel holder; and
a collimating lens held in said barrel for converting a beam emitted from said light source into a parallel beam, wherein said barrel includes a contact portion held in contact with a front surface of said collimating lens that is closer to said light source than is a rear surface of said collimating lens, and wherein the expression $W(\oplus(\Delta fb/\Delta T-\Delta L/\Delta T)\cdot(T-T_0)|)<0.03$ [$\lambda$] is satisfied when $\Delta L$[mm] denotes an amount of change in a distance from said light source to said front surface of said collimating lens, $W(\Delta L)$[$\lambda$] denotes an amount of wavefront aberration in relation to $\Delta L$, $\Delta fb/\Delta T$ denotes an amount of change in back focus of said collimating lens per unit temperature, $T0$ denotes a normal temperature, T denotes a temperature at which the beam shaping optical device is used, and $\Delta L/\Delta T$ [mm° C.] denotes an amount of change in a spacing between said light source and said collimating lens per unit temperature due to thermal expansion of said barrel, said barrel holder and said base.

* * * * *